Nov. 12, 1968　　　W. L. BAKER　　　3,410,531
MIXING APPARATUS
Filed May 19, 1967　　　　　　　　　　　2 Sheets-Sheet 1
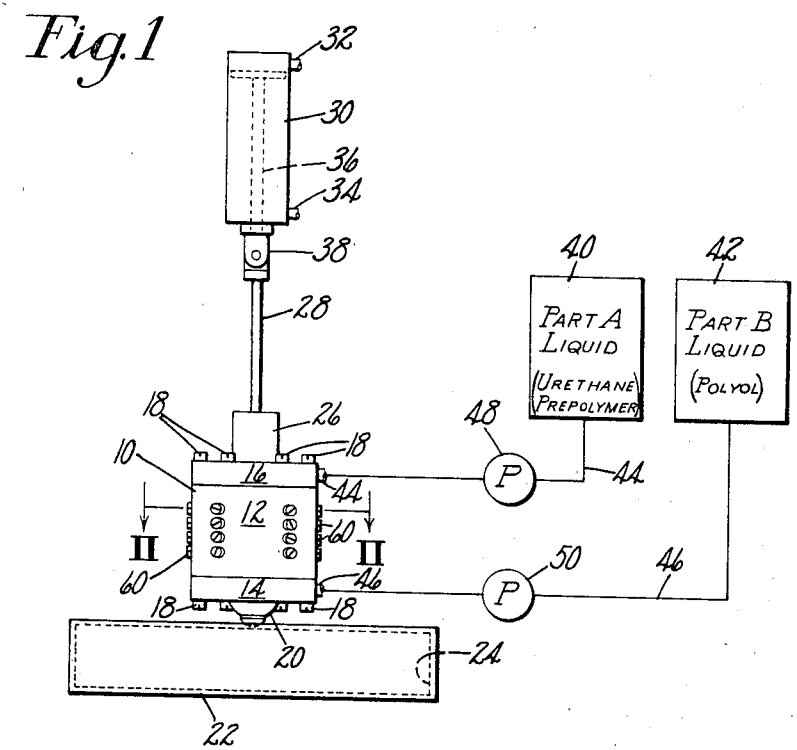
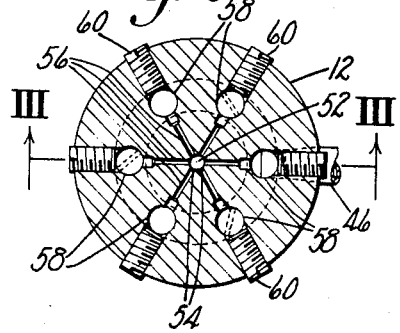
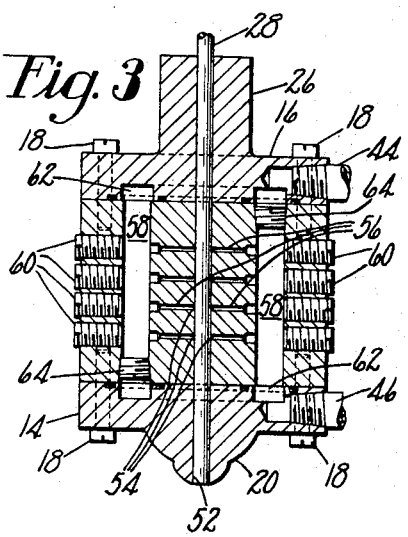
Inventor
Willard L. Baker
By his Attorney

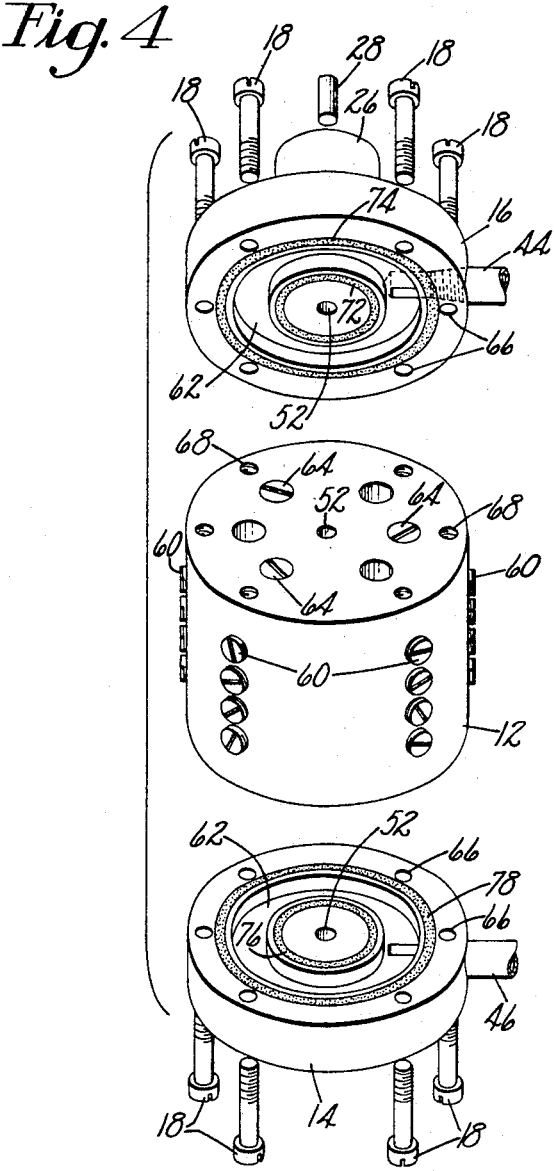

ated Nov. 12, 1968

3,410,531
MIXING APPARATUS
Willard L. Baker, Ipswich, Mass., assignor to United Shoe Machinery Corporation, Boston, Mass., a corporation of New Jersey
Filed May 19, 1967, Ser. No. 639,726
3 Claims. (Cl. 259—4)

ABSTRACT OF THE DISCLOSURE

Apparatus for admixing interactive compositions constituting a casing having a mixing bore with a piston located within the same and a plurality of composition charging passages communicating with the bore.

---

The present invention is directed to apparatus in which to carry out admixing of interactive compositions.

"Interactive" has reference to chemical reaction, and, less often, physical action had between two or more compositions which when admixed together under operating conditions result in the formation of solidified products. Operations in which this takes place are many times practiced in the production, application or use of organic polymeric systems. Examples include those practiced in the production of products from polyurethanes, polyepoxides, polyamides and other condensates in which two or more fluid or liquid starting compositions are caused to react by admixing them under heated, and/or catalyzed condition. In those instances the starting compositions may be basic starting materials, or, as is often the case in polyurethane production and use, one or more may be an intermediate, or in partially polymerized form, which is then subjected to admixing under conditions which bring about further advancement or polymerization to produce solidified products. The operations referred to may be used incidental to molding, casting, coating, adhesive and other production or application.

When interactive compositions are admixed it is generally important to have the admixing achieved in as rapid time as is possible. In that way more complete admixing, which results in a more uniform product or a product with more uniform properties throughout, can be produced. In addition to that in admixing those compositions there is a restriction of the time in which admixing may be carried out. This is often referred to as residence or dwell and in adhesive areas as open time. This has reference to the time span available between initiation of admixing and set up of the mix to a solidified condition or a condition of such high viscosity as to effectively interfere with further working of the mix. Working may include discharging the mix from the mixer, transfer of the same to a further operation as by pumping, etc., and distribution of the mix in a molding, film forming, coating or similar operation site.

For operations involving admixing of interactive fluid compositions, particularly where the residence time is comparatively short, it is common practice to use high speed shear mixers. Common examples are high speed propeller and screw type mixers. A first difficulty with those mixers is that the advantage gained from the introduction of high shear may in large part be lost because the frictional heat generated in the mix by the mixer generally causes increased activity which in turn reduces residence time. This, of course, is the situation where the interactivity of the compositions to be admixed is heat sensitive or critical in nature. In order to offset that, somewhat, it is common practice to provide high speed shear mixers with cooling expedients such as coils and jacketing for circulating coolants. This, of course, increases the complexity and cost of those mixers. A second difficulty with shear mixers is that they do not lend themselves to convenient use in admixing interactive compositions in an intermittent operation basis. With each shut off the mixing chamber must be cleaned or flushed to prevent set up of residual from the previous mix. Otherwise, the operation of the mixer is interferred with, and following mixes may be contaminated to the extent that chemical and physical properties end up less than uniform. Again flushing or cleaning after each run, particularly where multiple intermittent operations are involved, increases the complexity and cost of operating those mixers.

Mixers other than the high speed shear type have also been developed. These would include mixers based on pumped fluid circulation, fluid and fluid-gas vehicle spraying and others. Those too, suffer from various deficiencies, among them failure to conveniently achieve rapid and complete admixing of fluid interactive compositions.

It is an object of this invention to provide apparatus capable of rapidly admixing interactive fluid compositions.

It is another object to provide apparatus capable of rapidly admixing interactive fluid compositions which do not effectively cut down residence time through introduction of frictional heat.

It is another object of this invention to provide apparatus capable of rapidly admixing interactive fluid compositions, which is convenient and economical to operate and construct.

It is another object of this invention to provide apparatus capable of rapidly admixing interactive fluid compositions, which is adapted for convenient use on an intermittent operation basis.

These and other objects of this invention may be attained in an apparatus for rapidly admixing interactive liquid compositions comprising a casing defining a mixing bore, charging passages with openings communicating with the bore, and a piston located in the bore. The openings of the charging passages are located at spaced intervals along the mixing bore with a plurality of the openings located in the plane intersecting the axis of said bore at any said interval. In addition, the charging passages are oriented to extend radially from the openings for the same, communicating with the bore.

The following drawings are included for the purpose of illustrating the invention, in which:

FIG. 1 is a side view, with some parts broken and other parts represented schematically, showing the apparatus of this invention incorporated into a polymer molding system;

FIG. 2 is a top view, in section and with some parts broken, of the apparatus of this invention taken along the line II—II of FIG. 1;

FIG. 3 is a side view in section and with some parts broken of the apparatus of this invention; and FIG. 4 is an exploded perspective view, with some parts broken, of the apparatus of this invention.

Reference will now be made to the drawings, in which the apparatus of the present invention is described with reference to a polyurethane molding operation which involves admixture of two interactive, and specifically, inter-reactive fluid compositions.

In the embodiment shown in FIG. 1 the mixing apparatus includes a casing 10 made up of a block 12 and end plates 14 and 16. To facilitate attachment of those parts a number of slotted head bolts 18 are provided. End plate 14 includes a nozzle portion 20 shown leading into a mold 22, having a mold cavity 24 shown in phantom. End plate 16 includes an extended boss portion 26 primarily designed to stabilize a metering piston 28. To facilitate movement of the piston 28, an air cylinder 30 is provided. Air is circulated through the air cylinder 30 by means of air lines 32 and 34 leading from an air source, not shown. A rod 36 shown partly in phantom, of the air cylinder 30, and the metering piston 28 are connected through a coupling 38. The compositions to be admixed, which are shown described by legend, are maintained in separate storage tanks 40 and 42. Feeding of the compositions is carried out through lines 44 and 46, and integrated pumps 48 and 50.

Primary features of the mixing apparatus of the invention are shown in detail in FIGS. 2 and 3. A mixing bore 52 is located along the central axis of the casing 10, and the slidably adjustable metering piston 28 is positioned within the bore 52. As shown specifically in FIG. 3, the bore 52 has a plurality of charging openings 54 entering into the same at spaced intervals along its length. Extending radially from the openings 54 are charging passages 56, see specifically FIG. 2. As shown in both FIGS. 2 and 3 a plurality of charging passages 56 are located at each interval along the mixing bore 52. At each interval along the mixing bore 52 then, a number of openings 54 for the charging passages 56 are in essentially radially opposing relationship. The effect is to have the charging passages 56 entering in banks along the mixing bore 52. This arrangement provides excellent admixing of the components charged into the bore from the charging passages 56 because the various components are in effect directed simultaneously, and under determinable liquid pressure into one or more relatively restricted spaces within the mixing bore 52. By selective positioning of the piston 28, the number of banks of charging passages 56 to be in operation at any given time can be set with the result that the quantity of components being charged is metered. The charging passages 56 extend radially to open into composition distribution chambers 58. Plugs 60, which are shown as slotted head screws, reflect a machining method by which charging passages 56 may be provided in block 12.

An arrangement for the composition distribution chambers 58 in combination with other components, such as the charging passages 56, is shown in detail in FIGS. 3 and 4. A plurality, that is at least two, composition distribution chambers 58 are provided. In the embodiment shown, six chambers 58 are used. Each of the chambers 58 then communicates or connects with a plurality of charging passages 56. The number of distribution chambers 58 can be varied and similarly the number of charging passages 56 can also be varied. It is preferred practice to have a large number of charging passages 56; the larger the number, the greater may be the intimacy of admixing which may be obtained, and similarly the greater the amounts of compositions which may be admixed in a given time period. To facilitate increased numbers of charging passages 56 the number of chambers 58 may also be increased even though, as in the instant showing, the apparatus is intended to accommodate admixing of only two components.

The embodiment shown in FIGS. 2 and 3 has six chambers 58 and is adapted to admix two interactive components, and, as will be seen further in this disclosure in essentially equal amounts. In effecting this chambers 58 are divided into two batteries of three for each of the two components. Each battery is then connected into a single, separate component distribution way 62. The component distribution ways 62 are shown in the form of annular channels or grooves provided in the end plates 14 and 16. Distribution of the components from the distribution way 62 into the chambers 58 is controlled through use of plugs 64. The use of plugs 64, which are slotted head screws, has the added advantage that they may be conveniently removed and/or moved to accommodate changes in amounts and rate of components mixing. To facilitate admixing a greater number than two components, the apparatus can be provided with a greater number of component distribution ways, which in turn may be connected to further component sources.

In the embodiment shown, convenience of assembly is provided for by having the casing 10 made up of the block 12 and end plates 14 and 16, of bolted construction. Holes 66 in each of end plates 14, 16, and corresponding tapped holes 68 in the block 12 are adapted to receive the bolts 18. Ring gaskets 72 and 74 are fitted to the end plate 16 and similarly ring gaskets 76 and 78 to the end plate 14 in order to prevent leakage by the fluid components.

The apparatus of this invention may be operated conveniently to provide rapid and convenient admixing of interactive compositions. For example, two part urethane systems which have short residence times, and which on being admixed react to form a solidified product which may also be expanded, or cellular in nature, may be conveniently admixed and discharged either intermittently, or continuously, from the apparatus. As indicated in FIG. 1 the two interactive compositions, the one Part A, an isocyanate terminated urethane prepolymer or an aromatic polyisocyanate and the second Part B, a polyol or primary amine curative and if desired a blowing agent and a tertiary amine or organotin catalyst, are provided in tanks 40 and 42. Admixing may be improved by providing the components, and more often the composition of Part B in tank 42 at slightly elevated temperature. The mixing head 10 is adjusted so that the compositions are each directed through three chambers 58, then into charging passages 56 and finally into mixing bore 52 where admixing is carried out. The air cylinder 30 is operated to position the metering piston 28 within the mixing bore 52 and so define how many banks of charging passages 56 are to be operated during the particular run. The pumps 48 and 50 are adjusted as to pressure, the specific pressure used in each being defined by component amounts to be admixed, based on the case of the polyurethanes referred to on stoichiometric calculation and on the rheological properties of the components. The pump pressure may be adjusted so as to be sufficient to advance the components into the mixing bore 52 but also to discharge the admixed product obtained from the bore 52 and into the mold cavity 24. With actuation of the pumps 48 and 50 the system may be operated and maintained continuously in operation with the charging of mold or molds 22 for a predetermined period. With shut off or shut down of an operation, the piston 28 is advanced all the way through the mixing bore 52, in order to clear the latter of reacted product residue, and at the same time shut off all openings 54 and prevent any further charging or bleeding of components into bore 52. In that way the mixing apparatus is immediately ready for the next admixing operation.

The following example is provided for the purpose of further illustrating the present invention.

EXAMPLE

*Mixing apparatus*

A mixer as described above is provided having a mixing bore 3.25 inches in length and 0.1875 inch in diameter; also four banks of charging passages with each bank 0.156 inch removed from another and with each bank including six charging passages with each passage having a diameter of 0.0625 inch.

*Compositions*

Part A is a polyisocyanate material constituting polyphenyl polymethyl isocyanate, and Part B constitutes 30 parts polyoxyethylene glycol, 8 parts bisphenol A, 22 parts ethoxylated trimethylol propane, 0.02 part water, 0.06 part stannous octoate, 0.25 part tetramethyl butane diamine and 1.0 parts organosilicone copolymer. Parts referred to are parts by weight.

Admixing

Part A is provided at ambient temperature and Part B at 82–85° C. The parts are pumped into the mixer under 20 p.s.i. for Part A and 80 p.s.i. for Part B. At the temperatures indicated Part A has a viscosity of about 600 cps. and Part B a viscosity of about 2000 cps. Admixing is carried out at a 1:1 ratio. Admixing is operated for a period of 30 minutes during which a total of 10 gals. of the components is pumped into the mixer. During actual admixing all of the charging passages are left open to the mixing bore. The admixed product is directed from the mixer into a series of molds where it results in solidified, cellular products, actually a rigid foam, having a density of about 0.7. Admixing is shut off after each is filled, and is started up when the next mold is located in receiving position. This is done by directing the metering piston through the mixing bore. In each instance the bore is cleared, and after multiple operations the mixer is still immediately ready for a next run.

It will thus be seen that the objects set forth above, including those made apparent from the preceding description, are efficiently attained and since certain changes may be made in the above construction without departing from the scope of the invention, it is intended that all matter contained in the above description or shown in the accompanying drawing shall be interpreted as illustrative and not in a limiting sense.

Having thus described my invention what I claim as new and desire to secure by Letters Patent of the United States is:

1. Apparatus for rapidly admixing interactive fluid compositions comprising a casing defining a mixing bore, charging passages extending radially from openings communicatng with the bore and a piston located in the bore, the openings of the charging passages being located at spaced intervals along the mixing bore with a plurality of the openings located in a plane intersecting the axis of said bore taken at any of said spaced intervals, the piston being positionable in the bore to block the openings at one or more of said spaced intervals during charging of the compositions and to pass through the bore to discharge admixture from the same.

2. Apparatus according to claim 1 wherein the casing defines a plurality of composition distribution chambers with each of said chambers communicating with a plurality of the charging passages.

3. Apparatus according to claim 1 wherein the piston is connected to actuating means for selectively positioning the piston within the mixing bore.

References Cited

UNITED STATES PATENTS

| | | | |
|---|---|---|---|
| 2,890,868 | 6/1959 | Potchen | 259—4 |
| 2,951,061 | 8/1960 | Gomory | 259—4 XR |
| 3,219,483 | 11/1965 | Goos et al. | 259—4 XR |

WALTER A. SCHEEL, *Primary Examiner.*

J. M. BELL, *Assistant Examiner.*